United States Patent [19]
Kanerva

[11] Patent Number: 4,740,297
[45] Date of Patent: Apr. 26, 1988

[54] WATER SOFTENER CABINET

[76] Inventor: Robert A. Kanerva, P.O. Box 880, Stouffville, Ontario, Canada, L0H 1L0

[21] Appl. No.: 858,732

[22] Filed: May 2, 1986

[30] Foreign Application Priority Data

May 29, 1985 [CA] Canada ................................. 482704

[51] Int. Cl.⁴ ............................................. A47B 81/00
[52] U.S. Cl. .................................. 210/190; 210/251; 312/237
[58] Field of Search ............... 210/190, 191, 251, 282; 312/237

[56] References Cited

U.S. PATENT DOCUMENTS 3,669,270  6/1972  Flogel .................................. 210/123
4,026,801  5/1977  Ward .................................. 210/190
4,217,011  8/1980  Davis .................................. 312/237

FOREIGN PATENT DOCUMENTS 42212      5/1977   Canada .
1114529   12/1981   Canada .................................. 362/26
53271      8/1984   Canada .

Primary Examiner—Ivars Cintins

[57] ABSTRACT

A water softener cabinet for a water softener system employing the side-by-side arrangement of a brine tank and a resin tank. The brine tank is provided with a concave wall portion for removably receiving the resin tank. This nested arrangement reduces the amount of floor space required for the water softener system but maintains the advantage of easy separability of the brine tank from the resin tank to facilitate maintenance of the former.

6 Claims, 1 Drawing Sheet

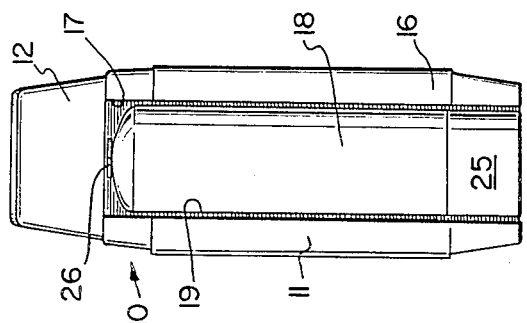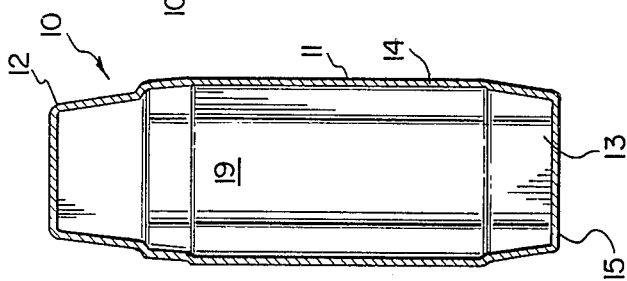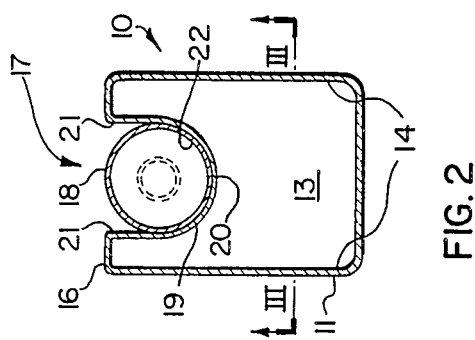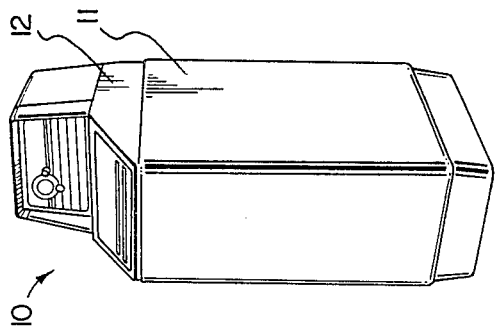

WATER SOFTENER CABINET

BACKGROUND OF THE INVENTION

I. Field of the Invention

This invention relates to a water softener cabinet for housing the tanks used in water softener systems, particularly those intended for domestic use.

II. Description of the Prior Art

Water softener systems make use of two tanks, one for holding the ion exchange resin used for water softening and the other for holding a brine solution which is periodically circulated through the resin in order to reactivate it after a period of use. The resin tank is usually permanently attached to the water supply system, but the brine tank should preferably be removable in order to facilitate regular cleaning which has to be carried out.

In known systems, the tanks are either mounted side by side or the smaller resin tank is mounted within the larger brine tank. The side-by-side arrangement facilitates the removal of the brine tank for cleaning but takes up a lot of space. The tank-in-tank arrangement is compact, but removal of the brine tank for cleaning is difficult.

The disadvantages of the two systems have been recognized and some attempts have been made to overcome them. For example, Canadian Pat. No. 1,114,529 issued on Dec. 15, 1981 to Water Refining Company Inc. discloses a system for enclosing a side-by-side arrangement of tanks within a single cabinet. While providing an attractive product, this system does nothing to solve the basic disadvantage of the side-by-side tank arrangement, namely that it takes up an undesirably large amount of floor space.

SUMMARY OF THE INVENTION

Accordingly, an object of the present invention is to provide a water softener cabinet for use with the side-by-side tank arrangement which nevertheless occupies little floor space approaching that required by the tank-in-tank arrangement.

According to the present invention there is provided a water softener cabinet for use with a generally upright resin tank, comprising: a cabinet body having an outer wall; and a brine tank located in said cabinet body; wherein a portion of said cabinet wall has a generally upright recess for removably receiving said resin tank therein; and wherein said brine tank has a generally upright wall having a concave wall portion shaped to partially surround said resin tank when present in said recess.

An advantage of the invention is that it provides a water softener cabinet that occupies less floor space than the conventional side-by-side tank arrangement while permitting the brine tank to be separated from the resin tank in a simple manner so that the brine tank may be removed for cleaning.

BRIEF DESCRIPTION OF THE DRAWINGS

FIG. 1 is a perspective view of a water softener cabinet according to one embodiment of the present invention;

FIG. 2 is a horizontal cross-section of the cabinet of FIG. 1 taken at approximately its mid height;

FIG. 3 is a vertical cross-section taken on the line III—III of FIG. 2; and

FIG. 4 is a rear view of the cabinet of FIGS. 1, 2 and 3.

DETAILED DESCRIPTION OF PREFERRED EMBODIMENTS

A water softener cabinet according to the present invention is indicated generally in the drawings by the reference numeral 10. The cabinet consists of a cabinet body 11 and a cabinet top 12.

The body 11 contains a brine tank 13 as shown in Figs. 2 and 3. In this particular embodiment the cabinet body is formed by a thin sheet-like upright wall 14 and a thin, sheet-like bottom wall 15 which are interconnected at their edges in a water tight manner. The inner surfaces of the walls 14 and 15 form the brine tank 13, so that the shape of the brine tank corresponds to the shape of the cabinet body.

The rear surface 16 of the cabinet body has a generally upright recess 17 for receiving a generally upright resin tank 18 as shown in FIGS. 2 and 4. The recess 17 is formed by an upright concave wall portion 19 of the brine tank 13 which wall portion, in this embodiment, is also a part of the cabinet body 11. The concave wall portion 19 is generally U-shaped in plan view as can be seen from FIG. 2 and comprises a curved central surface 20 and outwardly extending side surfaces 21. The curved central surface 20 corresponds in shape to the outer surface 22 of the resin tank 18 so that the curved central surface closely contacts the outer surface of the resin tank over part of the circumference of the latter, preferably over at least half its circumference. In fact, although not shown in the embodiment, the curved surface may extend around the resin tank on each side to points beyond the maximum width of the resin tank, so the resin tank is accordingly locked in position by the curved central surface 20 in the sense that rearward withdrawal of the resin tank 18 is permissible only if some flexing of the brine tank or resin tank walls is possible. For this purpose, the walls of the brine tank may be made of a slightly flexible material, as will be explained later.

The outwardly extending side surfaces 21 of the concave wall portion are separated by a distance which allows the resin tank 18 to pass therebetween and they extend outwardly from the curved central surface at least as far as the resin tank when the resin tank is in contact with the curved central surface. In this way, the resin tank is entirely hidden by the cabinet body 11 except when viewed from the rear as shown in FIG. 4.

The resin tank is free-standing (possibly on an enlarged base 25—see FIG. 4) and is connected to a water supply and to a water delivery tube (not shown) in the conventional manner. Accordingly, the resin tank is fairly immobile so that the cabinet 10 should be manoueverable around the resin tank. For this reason, the recess 17 extends to the bottom of the cabinet and to a height sufficient to clear the top of the resin tank. The cabinet and resin tank can thus be separated or joined by moving the cabinet forwardly or rearwardly, respectively, relative to the resin tank.

At least one tube is connected between the resin tank and the brine tank to allow the resin to be reactivated by the brine, and the top 12 of the cabinet may contain control valves and timers or the like for this purpose. However, since all of this is conventional and well known in the art, it is believed that details need not be provided here.

The cabinet body 11 and preferably the top 12 may be made from a suitable material, for example rotationally moulded plastic material. Such material is light in weight, relatively inexpensive and attractive in appearance. Moreover, such material has the slight flexibility necessary for resin tank withdrawal, as discussed above. The sides and bottom, and even the top 12, of the cabinet may be formed integrally, thus giving an attractive appearance and ensuring water tightness for the brine tank 13. Alternatively, however, the top 12 (or at least the control panel formng part thereof) may be removable to assist separation of the brine tank and the resin tank. The resin tank may be made from glass fiber reinforced plastic, but any suitable material may be employed.

Although not shown in the drawings, a locating channel may be formed in the top of the brine tank to receive a collar 26 normally present on the resin tank. This assures proper alignment between the brine tank and the resin tank as the latter is fitted around the former.

The softener cabinet and brine tank are preferably matched in size in the manner shown so that the brine tank closely contacts the resin tank. However, if the cabinet is designed to match in size the largest of a series of conventional resin tanks (e.g., of 9 inch diameter), the same cabinet may be used with the smaller resin tanks of the series. The brine tank would not then closely contact the outer surface of the resin tank, but the resin tank would nevertheless be nested within the cabinet and the brine tank would occupy little space compared with a conventional side-by-side tank arrangement.

In the preferred embodiment described above, the brine tank is formed by the inside surfaces of the cabinet body. In an alternative embodiment, however, the cabinet body and brine tank may be separate, i.e. the cabinet body may be formed by a cover surrounding a brine tank located therein. In such an embodiment, the brine tank is formed with a concave wall portion as discussed above and the cover surrounding the brine tank has a corresponding recess or slot to allow the resin tank to pass therethrough.

In summary, as can readily be seen from the drawings, the brine tank is formed by a thin wall 14,15 of substantially uniform thickness having an internal surface defining an interior volume for holding brine and an external surface which preferably forms the outer wall of the cabinet body. The wall has a re-entrant section formed by the concave wall portion 19, and the internal surface of this re-entrant section projects inwardly into the interior volume of the brine tank. Externally of the brine tank 13, the re-entrant section of the wall defines an upright recess and this is shaped and dimensioned to snugly receive the resin tank 18. Horizontal relative movement between the brine tank 13 and the resin tank 18 permits insertion of the resin tank into, or removal of the resin tank from, the recess. The outer wall of the cabinet body has an opening for permitting this horizontal relative motion between the brine tank and the resin tank to take place unimpeded by the cabinet body. When, as shown, the wall forming the brine tank and the wall forming the cabinet body are one and the same, this opening is the entrance to the re-entrant section.

With this arrangement, the brine-holding volume of the brine tank 13 extends partially around the sides of the resin tank 18 (when in position in the recess), so that there is very little unused space within the envelope of the cabinet body, and yet the resin tank 18 and the brine tank 13 can be separated from each other by a very simple operation involving merely pulling the brine tank in the horizontal direction.

By arranging the brine tank to partially surround the resin tank, the total floor space occupied by the water softener apparatus can be minimized for any required brine tank volume, while the advantage of easy separation of the brine tank and the resin tank is maintained.

Other variations of the invention will be readily apparent to persons skilled in the art and all such variations are included within the scope of the present invention as defined by the following claims.

What I claim is:

1. A water softener cabinet for use with a generally upright resin tank, comprising:
    a cabinet body having an outer wall; and
    a brine tank located in said cabinet body;
    said brine tank having an interior volume for holding brine and an exterior defined by a substantially upright wall of generally uniform thickness, said wall having a re-entrant section such that an interior surface of the wall section projects inwardly into said interior volume and an exterior surface of the wall section defines a generally upright recess in the exterior of the brine tank, said recess being shaped and dimensioned to snugly receive said resin tank therein while permitting insertion of said resin tank into or removal of said resin tank from said recess by horizontal relative motion between said brine tank and said resin tank; and wherein said outer wall of said cabinet body has an opening for permitting said horizontal relative motion between said brine tank and said resin tank to take place unimpeded by the cabinet body.

2. A cabinet according to claim 1 wherein said outer wall of said cabinet body and said upright wall of said brine tank are one and the same, and said opening in said cabinet body is formed by an entrance to said recess.

3. A cabinet according to claim 1 wherein said upright recess is generally U-shaped having a curved central surface being shaped to closely contact said resin tank over at least half its circumference and said side surfaces being separated by a distance which allows said resin tank to pass therebetween.

4. A cabinet according to claim 3 wherein said side surfaces extend outwardly from said curved central surface at least as far as said resin tank when said tank is in contact with said curved central surface.

5. A cabinet according to claim 1, wherein said cabinet body is made from a thin plastic sheet-like material.

6. A water softener system comprising a water softener cabinet as defined in claim 1, and a resin tank for location in said recess.

* * * * *